Oct. 20, 1959     H. SZABO     2,909,685
MAGNET CORE FOR PULSE MOTORS
Filed July 30, 1956
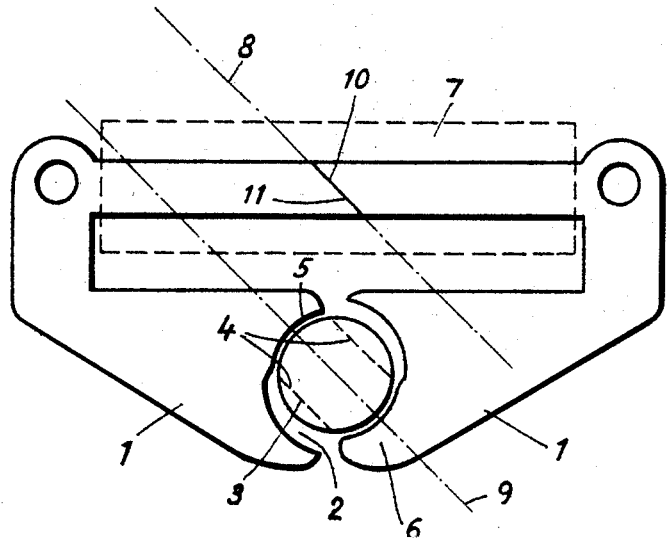
INVENTOR
HENRIK SZABÓ
By Hann and Nydick
ATTORNEYS

United States Patent Office 2,909,685
Patented Oct. 20, 1959

2,909,685

MAGNET CORE FOR PULSE MOTORS

Henrik Szabo, Hagersten, Sweden, assignor to Telefonaktiebolaget L M Ericsson, Stockholm, Sweden, a corporation of Sweden Application July 30, 1956, Serial No. 600,961

Claims priority, application Sweden August 8, 1955

2 Claims. (Cl. 310—191)

The present invention relates to a magnet core of special construction for pulse motors, facilitating the mounting operation.

The magnet core of pulse motors, used e.g. in secondary or slave clocks, is generally formed as a U or a horse shoe, the legs of which surround the rotor with their ends. The core generally consists of two or more parts so as to facilitate the application of a magnet coil on the core, this making necessary an accurate adjustment of the air gap between the stator parts and the rotor when assembling the halves of the core. In order to make the length of the joint and thus the air gap adjustable it is known to shape the co-operating ends of the core halves as steps or to allow at the joint laminas or protruding parts on the two halves to engage in the interspace of each other. The adjusting operation necessary for such a core consisting of two halves, is however troublesome and time consuming.

Said drawbacks are eliminated by the present invention, according to which a magnet core for a pulse motor is substantially characterized by the fact that it is provided with a recess for the rotor, said recess having such a shape, that its walls form two pole shoes located opposite each other, the core being divided into two halves along a plane which is parallel as well to the direction of the axis of the pole as to the axis of the rotor.

The invention will be described below by means of an embodiment shown in the enclosed drawing, on which a magnet core for a pulse motor is indicated by 1. The legs of the magnet core have at their ends opposite each other such a shape that a recess 2 is obtained for a rotor 3. The rotor comprises a permanent magnet, providing two poles on the rotor, the position of said poles being indicated by dotted lines 4. The recess 2 has such a shape that its walls form two pole shoes 5 and 6 located opposite each other, which through an air gap co-operate with the poles of the rotor. If a magnet winding 7 indicated by dotted lines, is fed with pole changing current pulses, a magnet flux through the pole shoes and the rotor will be obtained, so that at each current pulse the rotor will be turned 180°.

In order to facilitate the mounting of the magnet coil the core is divided into two parts along a plane 8 which is parallel with the pole direction 9 and with the rotor axis. The advantage of this device is that in the case of necessity of changing the size of the air gap by increasing or decreasing the distance of the pole shoes from each other—it is sufficient to move the two halves along their contacting surfaces 10, 11 in the plane 8. Due to the fact that the partition plane is parallel to the pole direction the pole shoes will be located opposite each other during the whole displacement. Thus it is possible to adjust the air gap between the pole shoes and the rotor in a simple way, e.g. by inserting a spacer having a thickness corresponding to the width of the desired air gap, between the rotor and the two halves of the core, pressing together said halves and fixing them in this position. During the whole displacement along the partition plane the end surfaces 10, 11 of the halves are in contact with each other, so that practically no air gap can arise at the joint and the magnetic resistance in the magnetic circuit will not be changed appreciably. In the shown embodiment the partition plane 8 encloses an angle of about 45° with the symmetry plane of the core. Said device is suitable owing to the fact that the ends of the legs of the core may be provided with pole shoes in a simple way, the axis of symmetry of which pole shoes has an inclination of about 45° with respect to the symmetry plane of the core. There is noting, however, to prevent the use of a different angle, e.g. 60°, if this is motivated by a more suitable placing of the pole shoes or by other points of view of construction.

By the present invention a pulse motor having a simple and economical construction is obtained, the mounting operation of which is considerably more simple than that of the earlier known devices.

I claim:

1. A magnet core for pulse motors comprising, in combination, a pair of core halves, each one of said core halves having a leg portion defining a pole shoe at one end and a winding support portion at the opposite end including a flat terminal surface, the pole shoe of one of said core halves being in direct spaced facing relationship with the pole shoe of the other of said core halves and defining a recess therebetween for rotatably receiving a rotor therewithin, the terminal end surfaces of said winding support portion of said core halves lying in a plane substantially parallel to a pole axis defined by a line extending symmetrically across said pole shoes, said terminal surfaces of said core halves being in slidable contact with each other for movement along a line parallel to said pole axis of said pole shoes and in a plane parallel to the longitudinal axis of a rotor disposed within said recess to adjust the air gap within said recess between said pole shoes.

2. A magnet core for pulse motors as set forth in claim 1, wherein said magnet core is symmetrical, and said terminal end surfaces of said core halves define an angle of substantially forty-five degrees with the plane of symmetry of said core.

References Cited in the file of this patent

UNITED STATES PATENTS

| | | |
|---|---|---|
| 996,253 | Johnson | June 27, 1911 |
| 1,193,270 | Kolff | Aug. 1, 1916 |
| 1,818,330 | Horni | Aug. 11, 1931 |
| 2,236,956 | Van der Heem | Apr. 1, 1941 |